(12) United States Patent
Bergeron et al.

(10) Patent No.: US 6,712,352 B2
(45) Date of Patent: Mar. 30, 2004

(54) LOCKABLE REMOVABLE CASSETTE

(75) Inventors: Alfred F. Bergeron, Chester Springs, PA (US); Robert Clauser, Columbus, NJ (US); Christopher L. Crawford, Pottstown, PA (US); David C. Deaville, West Chester, PA (US); Michael D. Nunn, West Chester, PA (US); Jeffrey T. Thawley, Claymont, DE (US); Kenneth B. Wood, Downingtown, PA (US); Stephen R. Watrous, Moravia, NY (US)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/982,578

(22) Filed: Oct. 16, 2001

(65) Prior Publication Data

US 2002/0056960 A1 May 16, 2002

Related U.S. Application Data

(60) Provisional application No. 60/241,197, filed on Oct. 17, 2000.

(51) Int. Cl.[7] .............................................. B65H 29/46
(52) U.S. Cl. ........................ 271/180; 271/181; 232/15
(58) Field of Search ................................. 271/3.17, 306, 271/184, 264, 265.01, 177, 180, 181; 232/1 D, 15; 194/206, 207, 200; 109/45, 46; 209/534; 220/273, 264

(56) References Cited

U.S. PATENT DOCUMENTS

| | | | |
|---|---|---|---|
| 901,778 A | 10/1908 | Bucknam | |
| 1,394,941 A | 10/1921 | Ruebsamen et al. | |
| 2,973,139 A | 2/1961 | Leone et al. | 232/15 |
| 3,016,185 A | 1/1962 | Osborne | 232/15 |
| 3,773,252 A | 11/1973 | Jensen | 232/1 R |
| 3,918,371 A * | 11/1975 | Gartner et al. | 109/64 |
| 3,966,116 A | 6/1976 | Dominick et al. | 232/7 |
| 4,050,562 A | 9/1977 | Schwippert et al. | 194/4 E |
| 4,313,601 A | 2/1982 | Graef et al. | 271/207 |
| 4,341,100 A | 7/1982 | Kohlhage | 70/63 |
| 4,434,931 A | 3/1984 | Hunt et al. | 232/15 |
| 4,513,439 A * | 4/1985 | Gorgone et al. | 382/135 |
| 4,648,327 A | 3/1987 | Toth et al. | 109/57 |
| 4,655,391 A * | 4/1987 | Granzow et al. | 232/43.1 |
| 4,807,736 A | 2/1989 | Kondo et al. | 194/206 |
| 4,840,368 A | 6/1989 | Uehara | 271/162 |
| 4,854,247 A | 8/1989 | Sciortino et al. | 109/1 R |
| 4,896,826 A | 1/1990 | Bernier | 232/7 |
| 4,913,341 A * | 4/1990 | Bachman | 232/1 D |
| 4,949,901 A | 8/1990 | Harris | 232/15 |
| 4,977,583 A | 12/1990 | Gorgone | 377/8 |
| 4,997,128 A | 3/1991 | Suris | 232/16 |
| 5,014,857 A | 5/1991 | Kondo | 209/534 |
| 5,205,481 A | 4/1993 | Dekker | 232/16 |
| 5,209,335 A | 5/1993 | Shuren et al. | 194/200 |
| 5,209,395 A | 5/1993 | Zouzoulas et al. | 232/15 |
| 5,224,579 A | 7/1993 | Brown | 194/350 |
| 5,251,738 A * | 10/1993 | Dabrowski | 194/206 |
| 5,405,131 A * | 4/1995 | Zouzoulas | 271/181 |
| 5,632,367 A | 5/1997 | Bergeron et al. | 194/207 |
| 5,662,202 A * | 9/1997 | Suris | 194/206 |
| 6,042,001 A | 3/2000 | Siler et al. | 232/30 |

FOREIGN PATENT DOCUMENTS

WO     WO 01/23290 A1     5/2001     ........... G07D/11/00

* cited by examiner

*Primary Examiner*—Donald P. Walsh
*Assistant Examiner*—Mark J Beauchaine
(74) *Attorney, Agent, or Firm*—Fish & Richardson P.C.

(57) ABSTRACT

A lockable, removable cassette is described. In an implementation, the cassette includes a plastic shell and a currency access door. The cassette may also include a flexible handle and/or an integrated grip. In addition, the cassette may include at least one of an aperture and a transparent window positioned to reveal the contents of the cassette. In an implementation, the cassette includes a stacking mechanism which may include a drive means having non-circular drive gears.

45 Claims, 18 Drawing Sheets

LOCKABLE REMOVABLE CASSETTE

This application claims priority from copending U.S. provisional application No. 60/241,197 filed Oct. 17, 2000.

BACKGROUND OF THE INVENTION

The invention pertains to an improved method of construction for lockable removable cassettes or cash boxes used for the protection of banknotes in automated handling equipment such as gaming machines, vending machines, automated teller machines and the like.

Current cash box products suffer from several deficiencies, including not being sufficiently rugged for general handling, and being of high cost. Further, it is not possible to distinguish a full cash box from an empty one without opening a currency access door with a key, conventional cash boxes require operation of a latch before removal is possible, and such cash boxes do not give a positive or easily recognizable indication that the cash box has not been properly seated in the host machine.

SUMMARY OF THE INVENTION

The present invention pertains to a lockable, removable cassette which includes improvements described herein that address all of the above defects.

An improved mechanism for stacking bills is also described. The improvements include a means to achieve a large stroke in a compact geometry and a means to adjust the available force on the pusher plate mechanism as a function of the pusher extension. Optimum compactness and efficiency can thereby be achieved.

Other features and advantages of the invention will be apparent from the following detailed description as illustrated by the accompanying drawings. The drawings are not necessarily to scale, emphasis instead being placed upon illustrating the principles of the invention.

BRIEF DESCRIPTION OF THE DRAWINGS

Like reference numbers in the various drawings indicate like elements throughout the different views.

DETAILED DESCRIPTION

Figure 1:
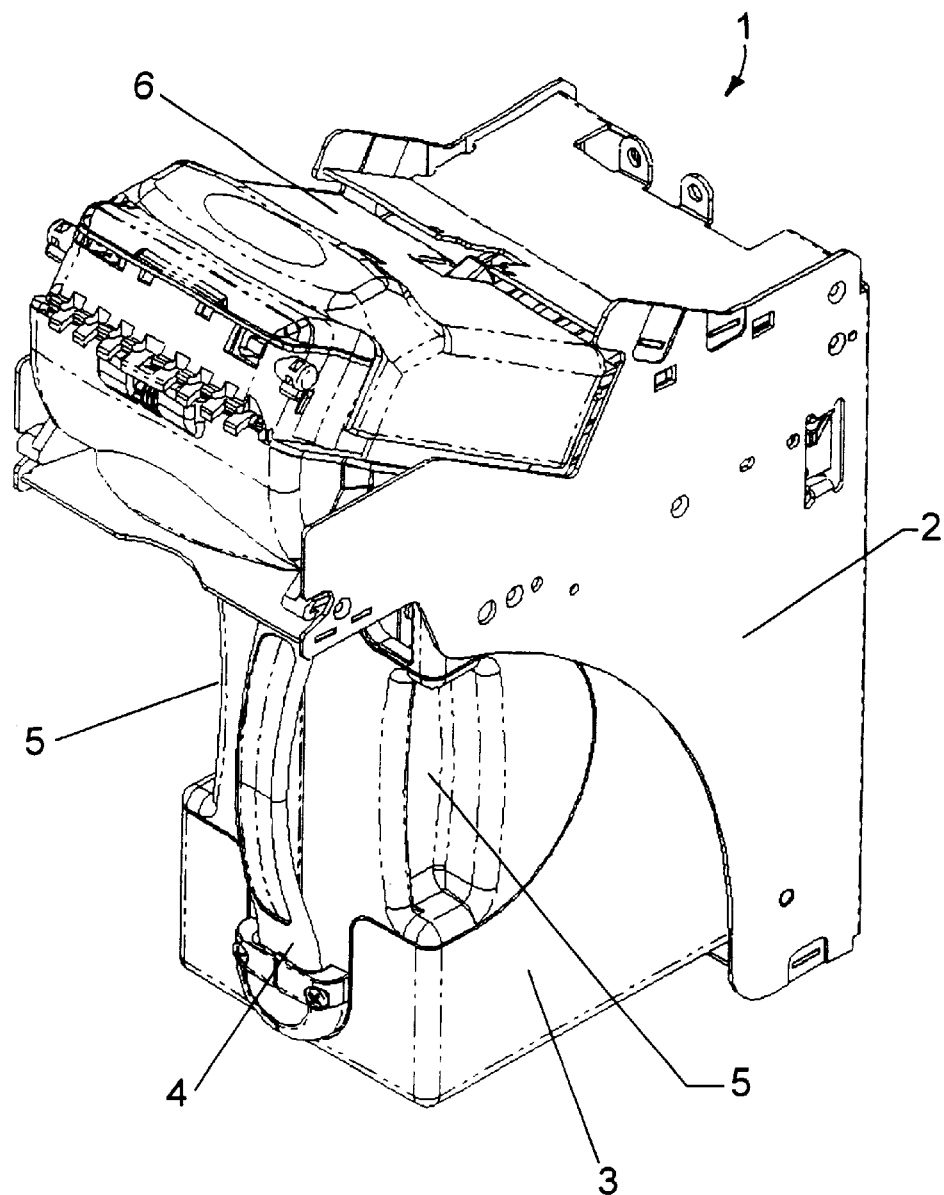
FIG. 1 is an isometric view of a bank note processor with an installed cassette according to the invention.

FIG. 1 shows a banknote processor (1) that includes a chassis (2), a removable secure banknote cassette (3) and a removable banknote validator (6). The chassis (2) is typically securely affixed to a host machine by mounting screws and therefore is usually not removed during normal operation or typical repair. The cassette (3) and validator (6) may be removed from the chassis (2) independently of each other.

During normal operation the removable secure banknote cassette (3) is removed when it is desired by the operator to extract the stored payment media such as banknotes. It should be noted that the terms banknote, bill, paper currency, security document, coupons and the like denote items which may be inserted into the validator, transported and then stored in the cassette.

FIG. 1 shows the front of the removable secure banknote cassette (3) approximately as it is presented to an operator or service personnel. As shown, a flexible cassette handle (4) is presented in a convenient ergonomic location that allows the operators wrist to remain in a vertical plane while removing the cassette. The main part of this handle (4) may be molded from an elastomeric material. This has two important benefits. It provides operator comfort, which is important in an environment where cassettes are handled frequently. It also provides an ability for the handle to deflect, or lie flat against the cassette to avoid collision with cashbox door and any lock assemblies that may be part of the host machine. Previous cash box products have used folding mechanisms to achieve a compact cassette handle, but such mechanisms have been fairly complex and difficult to manufacture resulting in higher costs and reduced ergonomic benefit. Notwithstanding the above accommodations, there may still exist host automatic transaction machines which cannot even accept a cassette with a flexible handle. For such automatic transaction machines having no clearance or little clearance the cassette handle (4) may be removed. The cassette can still be gripped using an integral molded cassette grip (5) fabricated on either side of the body of the cassette. The integral cassette grip (5) includes depressions that are conveniently implemented in the injection-molded parts at no cost, and can be conveniently gripped by an operator's fingers and hand. Further, the integral grip is extremely durable and remains operational even if the primary cassette handle (4) is damaged or removed.

Figure 8:
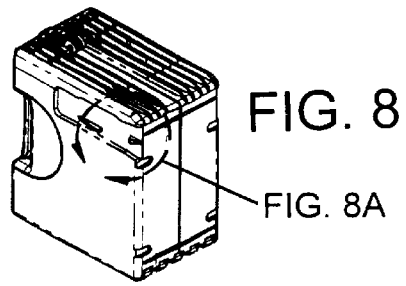
FIG. 8 is a detailed view of cassette showing an installation guide groove and latching ramp.
Figure 8A:
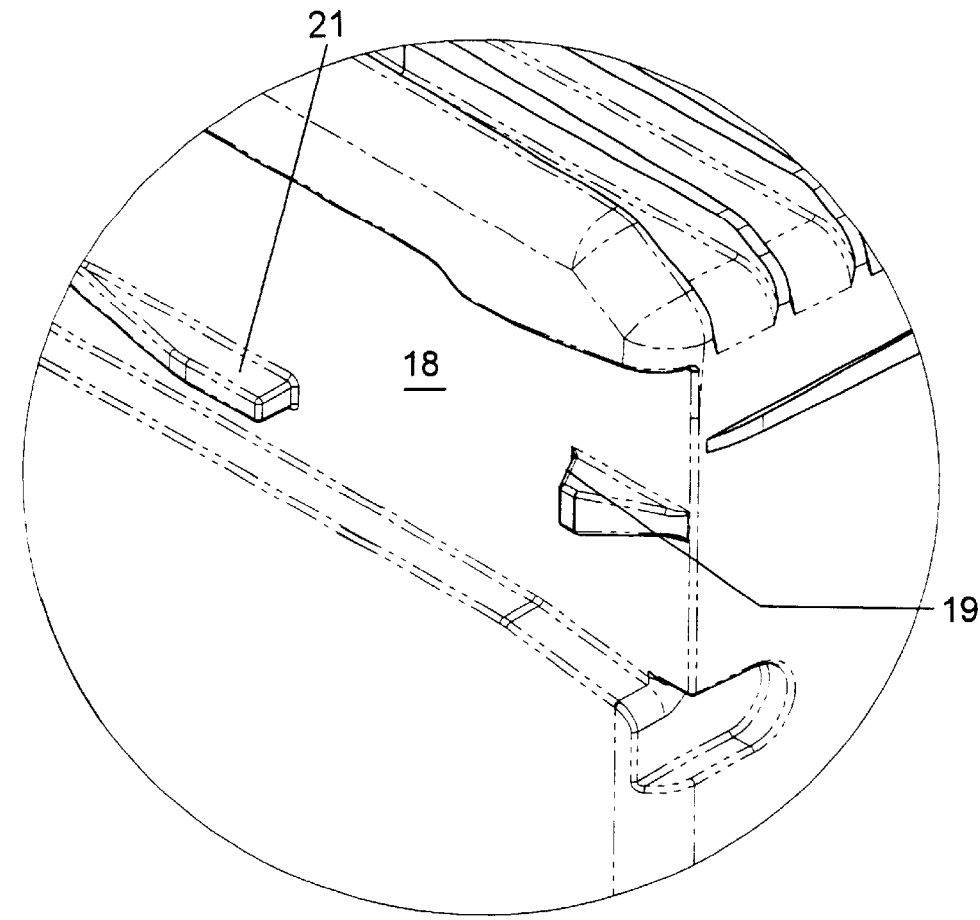
FIG. 8A is a detail view of part of FIG. 8.
Figure 9:
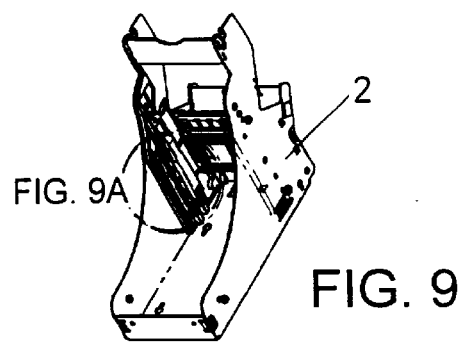
FIG. 9 is a detailed view of chassis showing the cassette installation guide rails and springs.
Figure 9A:
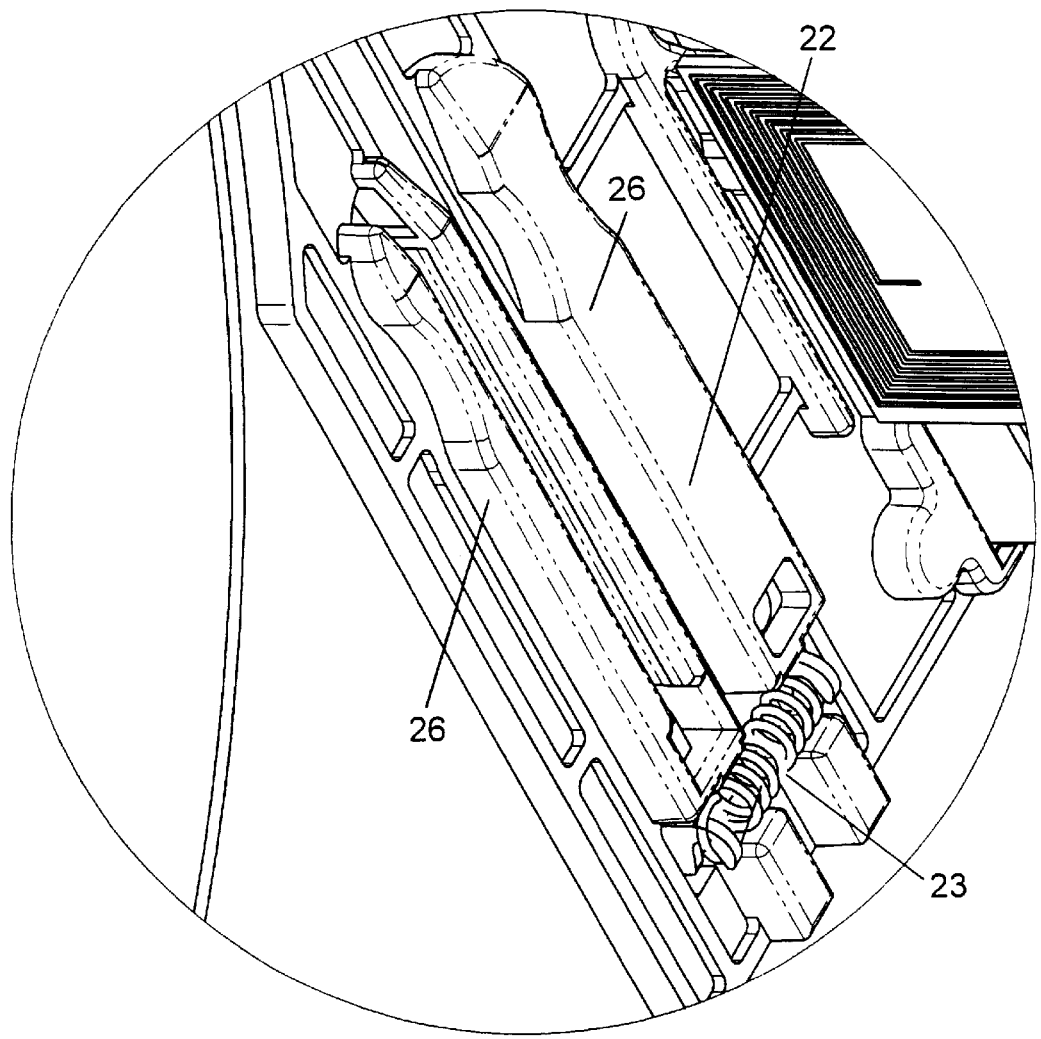
FIG. 9A is a detail view of part of FIG. 9.
Figure 10:
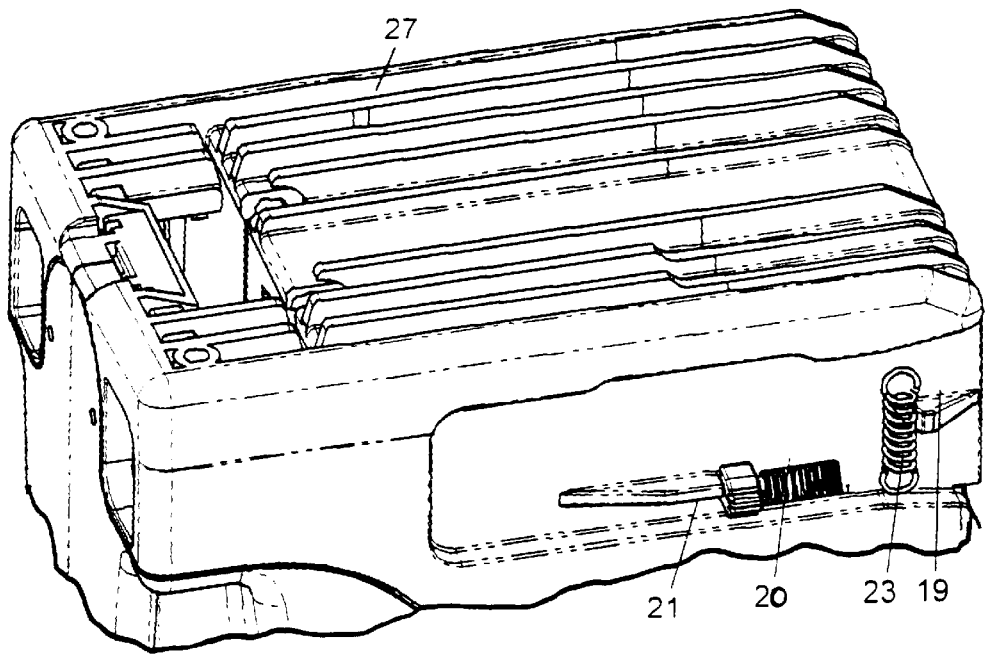
FIG. 10 is a simplified view showing springs for the cassette in the latched position.
Figure 11:
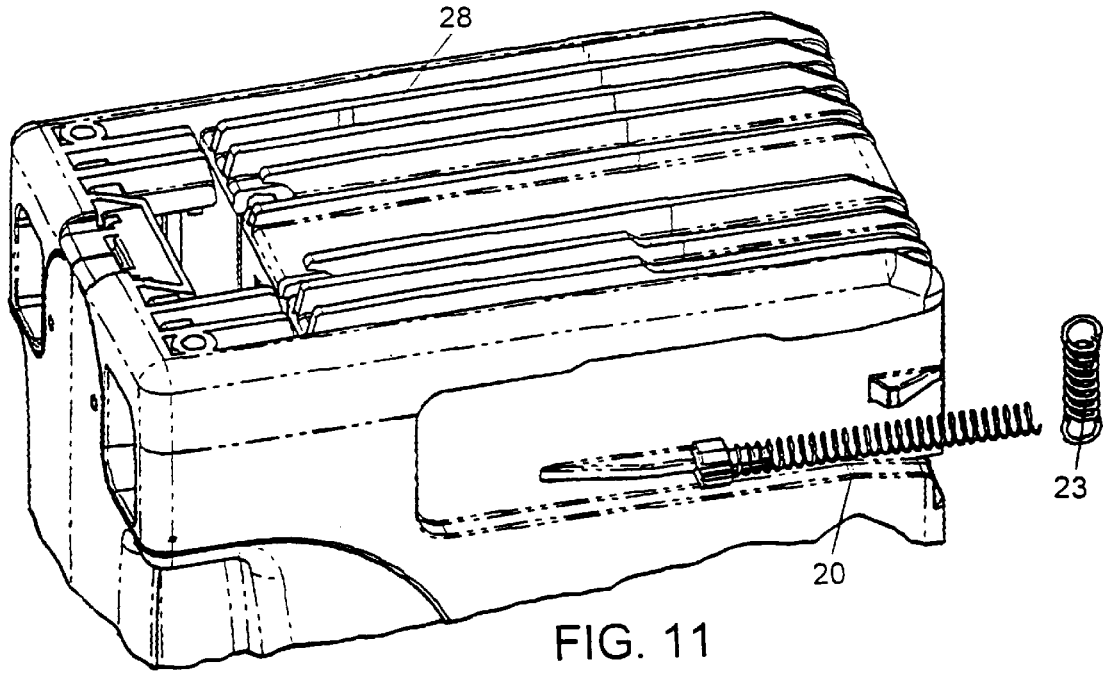
FIG. 11 is a simplified view of the cassette and retention springs in the unlatched position.
Figure 12:
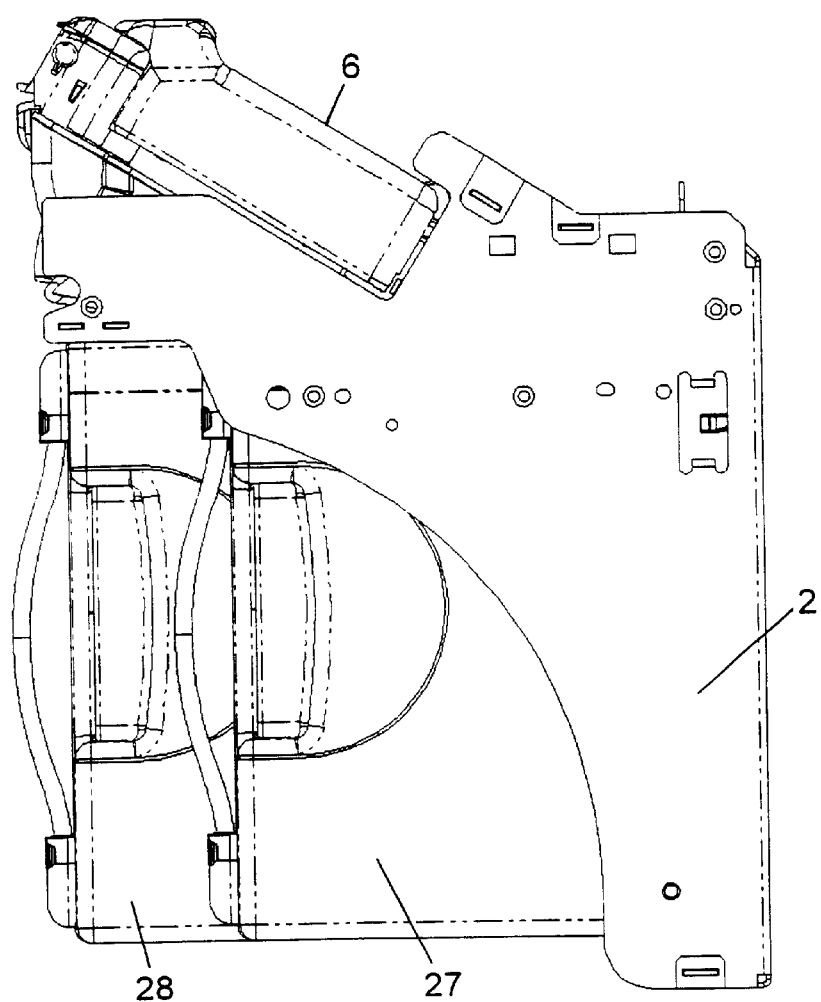
FIG. 12 is a side elevation view of the banknote acceptor showing the cassette in its latched and unlatched locations.

Removal of the secure banknote cassette (3) is achieved by exerting a pull force on the cassette handle (4) or the cassette grip (5) sufficient to overcome a retention force. Referring to FIGS. 8 and 9, the retention force is provided by a cassette latching spring (23) on a latching ramp (19) (see the latch ramp detail in FIG. 8, and the location of cassette ejector springs shown in FIG. 9). Referring to FIGS. 8, 10 and 12, once sufficient force to overcome the retention force has been applied by an operator, the action of an ejector spring (20) on an ejection lug (21) causes the removable secure banknote cassette (3) to move approximately two inches, in this implementation, toward the operator. Thus, FIG. 12 shows the positions of an installed cassette (27) and an ejected cassette (28). Once ejected, the removable secure banknote cassette (3) can then be slid out of the chassis without further resistance. FIG. 10 is a partial cutaway view of an installed cassette with the cassette springs in their latched position, while FIG. 11 illustrates the cassette springs in their unlatched position.

During typical operations, an empty cassette replaces a removed one. Inserting another cassette is also achieved in a simple manner. Referring to FIGS. 9, 10 and 11, the removable secure banknote cassette (3) is first approximately aligned with chassis guide rails (26) and then pushed home with sufficient force and stroke to overcome the resistance of the ejector spring (20) and the spring member (23) on the latching ramp (19).

In the present implementation, if the insertion effort is unsuccessful the ejector (20) will push the removable secure banknote cassette (3) back towards the operator by approximately two inches as shown by the ejected cassette (28) in FIG. 12. This gives a clear visual indication and tactile feedback to the operator that the operation did or did not succeed. Furthermore, in many applications involving various automatic transaction machines it will not be physically possible to close the outside panel access doors of the automatic transaction machine with the removable secure banknote cassette (3) in the ejected position. FIG. 12 illustrates the difference in positions between a latched or installed cassette (27) and an unlatched or ejected cassette (28) in relation to the chassis (2) and bill validator (6).

Figure 3:
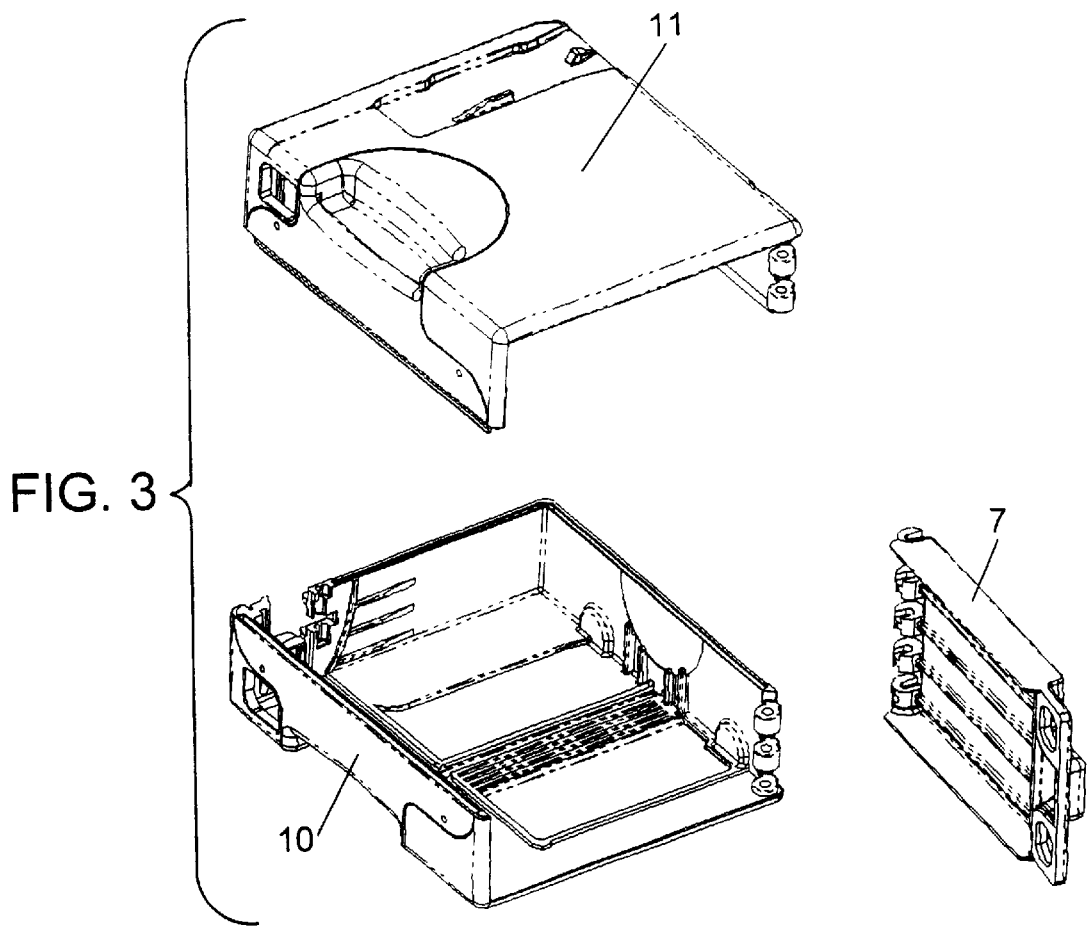
FIG. 3 is an exploded view of the cassette assembly showing how an enclosure according to the invention is formed of two half shells and a secure lockable door.

The construction of the removable secure banknote cassette (3) is now described in more detail. The cassette (3) may be made from molded plastic and have a single wall construction. FIG. 3 is an exploded view of an implementation of a cassette shell assembly. Referring to FIG. 3, the outer shell includes a cassette left half (10), a cassette right half (11) and a currency access door (7). The two halves of the cassette may be provided with a tongue and groove feature to facilitate assembly alignment and welding. A suitable joining process may utilize a plastic welding process commercially available from EmaBond, a division of the Ashland Chemical Company. A novel aspect lies in the application of this known process to the field of payment systems. A brief summary of the welding process is shown in FIGS. 4 to 6 and is provided here for informational purposes.

In an implementation, the plastic shell halves of the lockable removable cassette (3) may be molded with inserts of reinforcing material. It is also contemplated that the outer shell may be overmolded with a resilient material or a soft material. For example, cassette left half (10) and cassette right half (11) may be fabricated by first inserting steel parts (for strength) into an injection mold tool and then molding plastic against the parts to form the cassette outer shell pieces. In addition, or alternately, a soft resilient material, such as a pliable rubber or the like, could be overmolded around a portion or all of the outer shell to enable the cassette (3) to better absorb impacts. One skilled in the art would recognize that various materials could be used to either impart strength or improve shock absorption, and that such materials may be applied to a portion or to the entire structure of the cassette.

Figures 4, 5, 6:
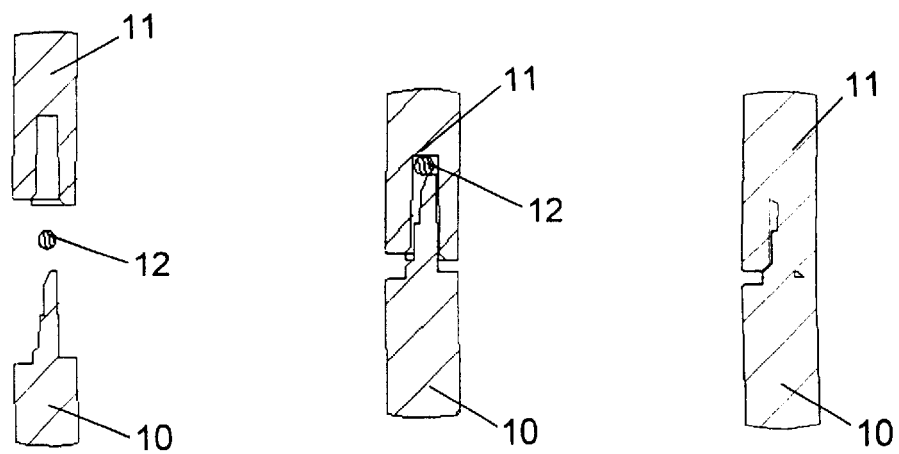
FIG. 4 is a detailed cross section of a welded joint before welding occurs.
FIG. 5 is a detailed cross section of the welded joint of FIG. 4 just prior to bonding.
FIG. 6 is a detailed cross section of welded joint after bonding.

FIG. 4 is an exploded view of a portion of the two halves of the cassette to be joined shown positioned prior to assembly. Prior to welding, a weld bead or weld material (12) is inserted and is sandwiched in the joint as shown in FIG. 5. The weld material (12) contains a fusible carrier typically made of the same thermoplastic material as the left half of cassette (10) and the right half of cassette (11). In addition it contains a ferritic heating material in a distributed form. The pre-assembled joint as shown in FIG. 5 is next subjected to an intense radio frequency field. The absorption of this field by the heating agent causes the weld material to fuse and form a thermal weld between the halves. Slight pressure is then applied to fully close the joint until it has cooled into a rigid state as shown in FIG. 6. In this manner a durable single-wall construction of the cassette (3) as shown in FIG. 3 is achieved.

Figure 2:
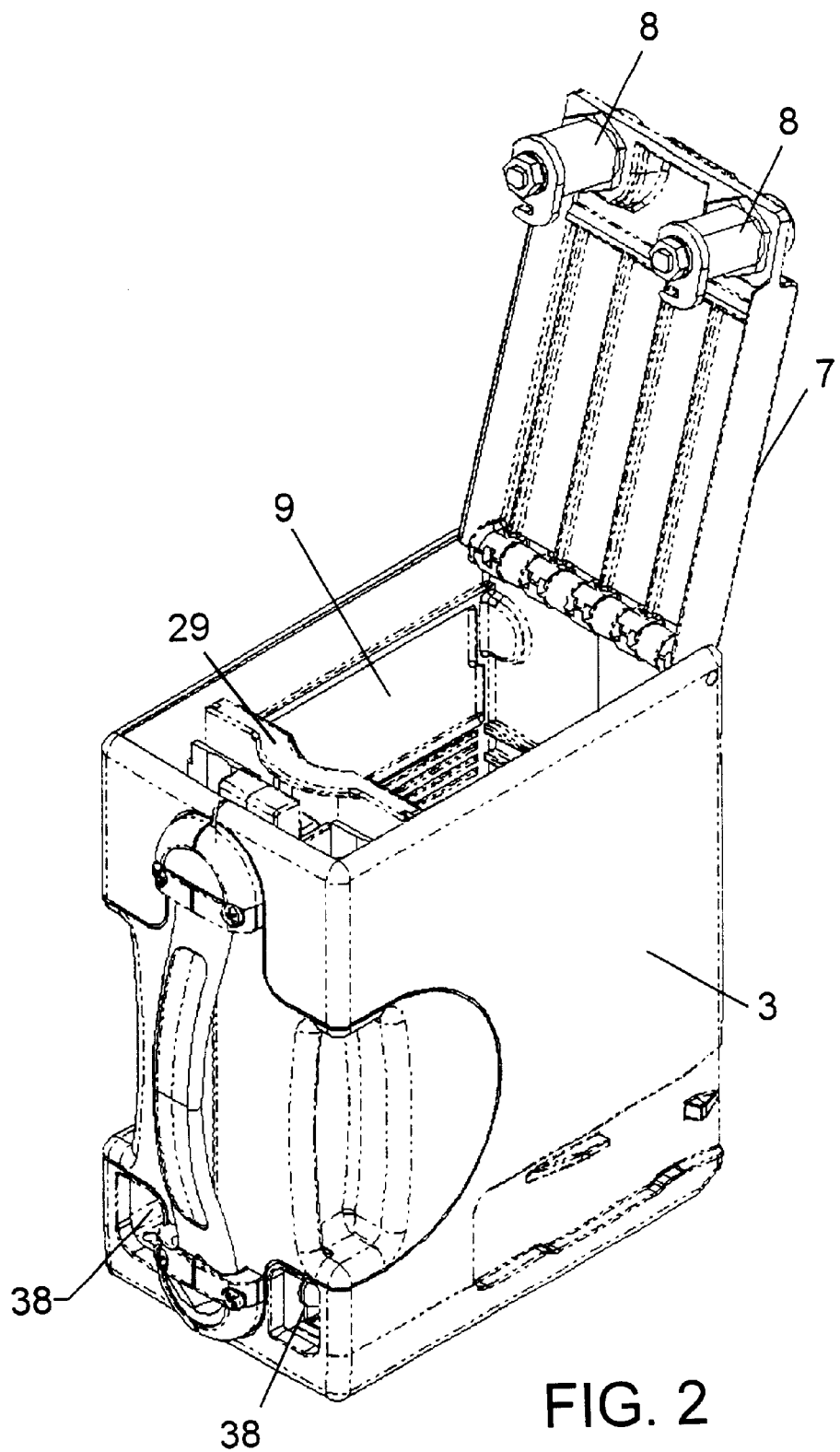
FIG. 2 is an isometric view of the lockable cassette removed from the acceptor showing the cash access door in the open position.
Figure 13:
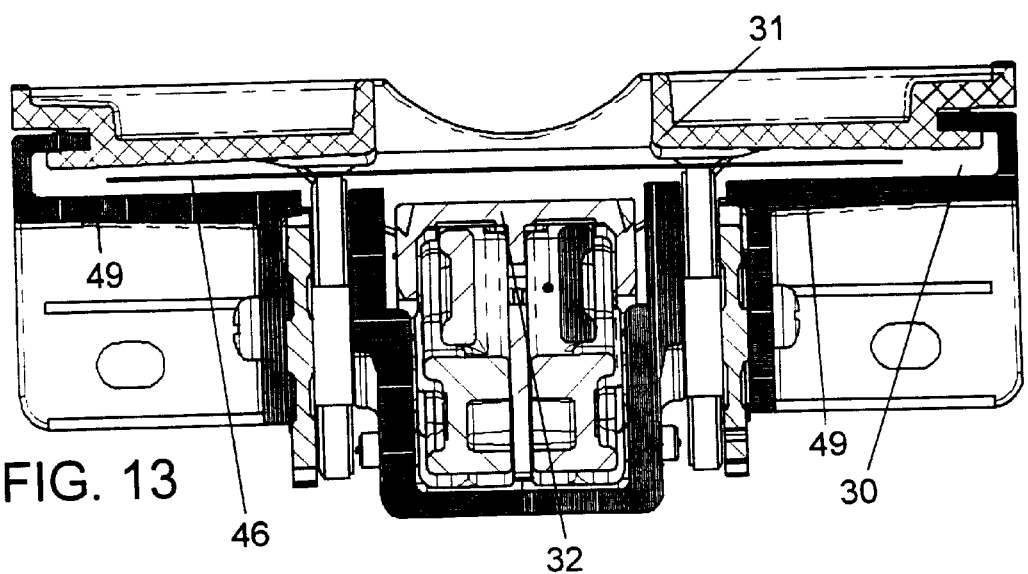
FIG. 13 is a cross section of the banknote path in the stacker mechanism.

FIG. 2 illustrates the various components of an assembled cassette (3) with access door (7) in an open position. In particular, a portion of a stacking mechanism(29) can be seen seated in the cassette adjacent to the banknote compartment (9). The access door (7) includes locking means (8) which conventionally require the use of keys (not shown) to unlock. A pair of viewing windows (38) has been provided in the outer shell of the removable secure banknote cassette (3) in the bottom portion that face an operator when installed. These apertures (38) together with the use of transparent materials for the aperture plate (31) and the banknote channel housing (49) of the stacker mechanism (29)(See FIG. 13, which is a cross-section illustration of the stacker) make it possible to see a portion of the last bill or banknote (46) inserted when the cassette is installed. This provides the operator with two useful advantages: Firstly, the operator can easily determine whether the removable secure banknote cassette (3) contains any documents or if it is empty. Secondly, it is possible to resolve disputes with a customer over the denomination of the last bill (46) inserted without having to remove the cassette (3) from the chassis (2). Both the above functions are useful in situations where access to the keys for opening the locks (8) of the currency access door (7) of the removable secure banknote cassette (3) is tightly controlled.

Figure 16A:
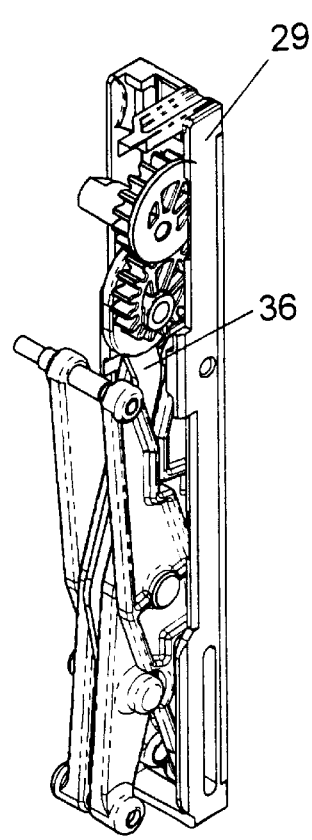
FIGS. 16A and 16B are an isometric view and a detail view, respectively, of the stacker mechanism in the fully retracted position.
Figure 16B:
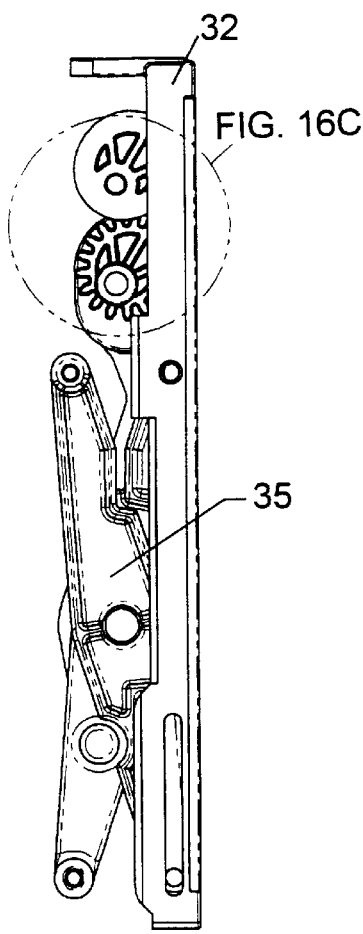
Figure 16C:
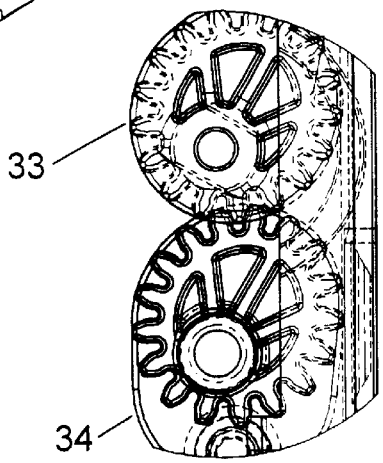
FIG. 16C is a detail view of part of FIG. 16B.
Figure 17:
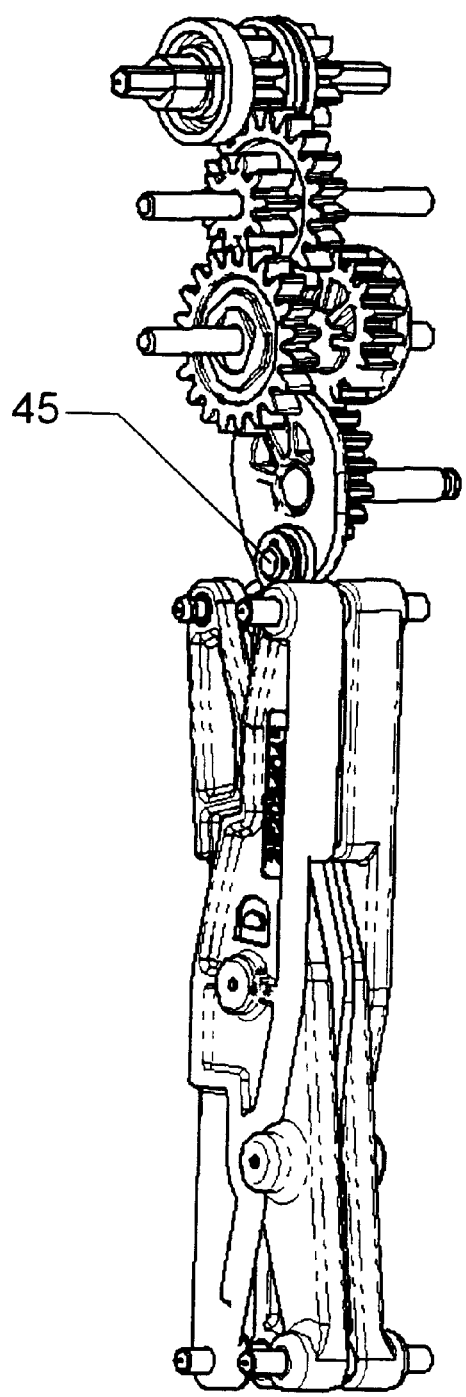
FIG. 17 is an alternative view of the stacker illustrating how the non-circular gears are connected to the scissor mechanism via a crank pin.
Figure 18A:
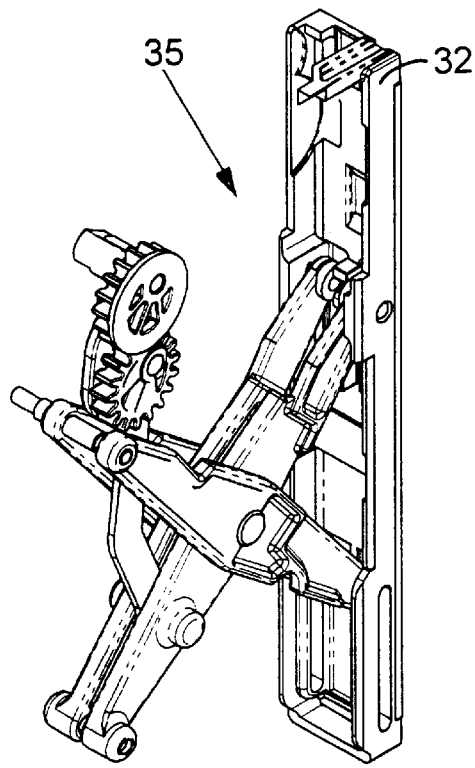
FIGS. 18A and 18B are isometric and detail views of the stacker mechanism in the fully extended position.
Figure 18B:
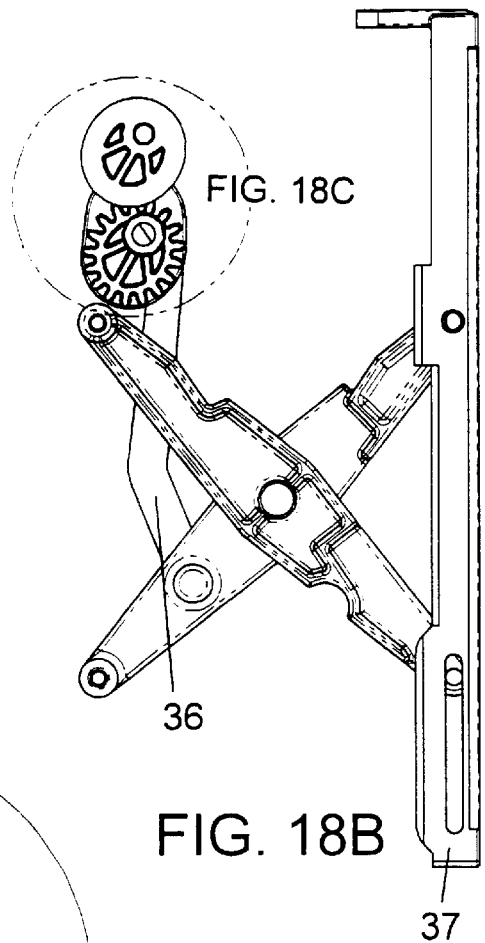
Figure 18C:
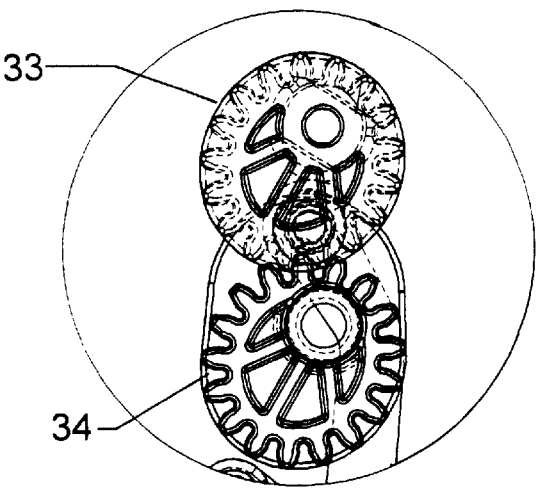
FIG. 18C is a detail view of part of FIG. 18B.

In general, stacking mechanisms that include a banknote pusher plate and scissors arrangement for storing bills in a cash box are well known. However, as shown in FIGS. 16, 17 and 18, the present stacking mechanism (29) activates scissor arms (35) by means of a central link arm (36) attached to a crank pin (45). The essential kinematic elements of this linkage are shown in FIG. 14 and FIG. 15.

Figure 14:
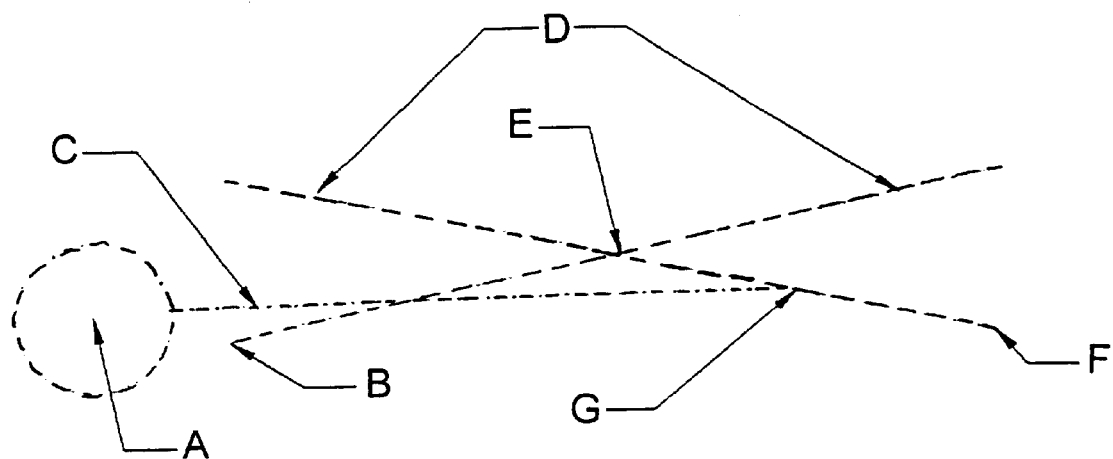
FIG. 14 is a kinematic diagram of the stacker mechanism in the retracted position.
Figure 15:
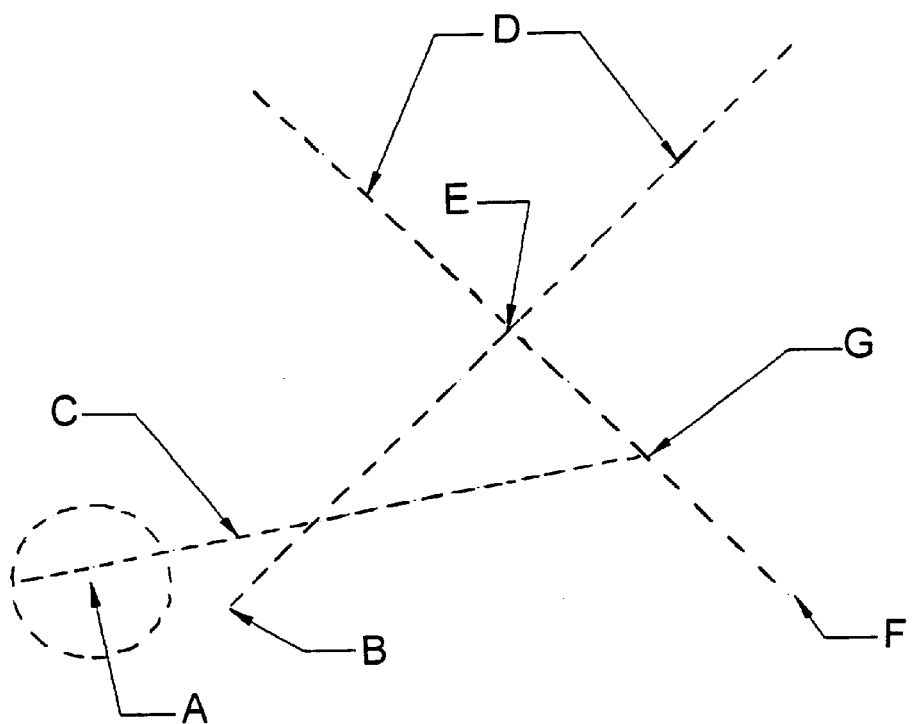
FIG. 15 is a kinematic diagram of the same stacker mechanism of FIG. 14 in the extended position.

Regarding FIGS. 14 and 15, the crankshaft rotates about a fixed center (A). One end of the scissor mechanism is pivotally mounted about the fixed point (B). The other end of the scissors mechanism is connected to the frame at (F) by a pivot point that has freedom to slide in one direction only. A link arm (C) connects the crankshaft to the scissors at a pivot point (G). In prior art systems it is conventional to make points (G) and (F) coincident. The present implementation, however, obtains a maximum scissor stroke within a small height, wherein the height is primarily constrained by the radius of the crank mechanism. In particular, use of an offset between points (G) and (F) permits some amplification of the scissor stroke, such that a reduced thickness or compact stacking mechanism (29) is obtained. Referring to FIG. 15, when the crankshaft rotates to pull link arm (C) to the left in the drawing, the scissor arms are extended such that the angle (D) between scissors is reduced and the crossover point (E) moves toward a banknote compartment to move a pusher plate to store a banknote. The technique of stacking bills using a pusher plate and an aperture plate is well known and will not be discussed in detail herein.

Figure 7:
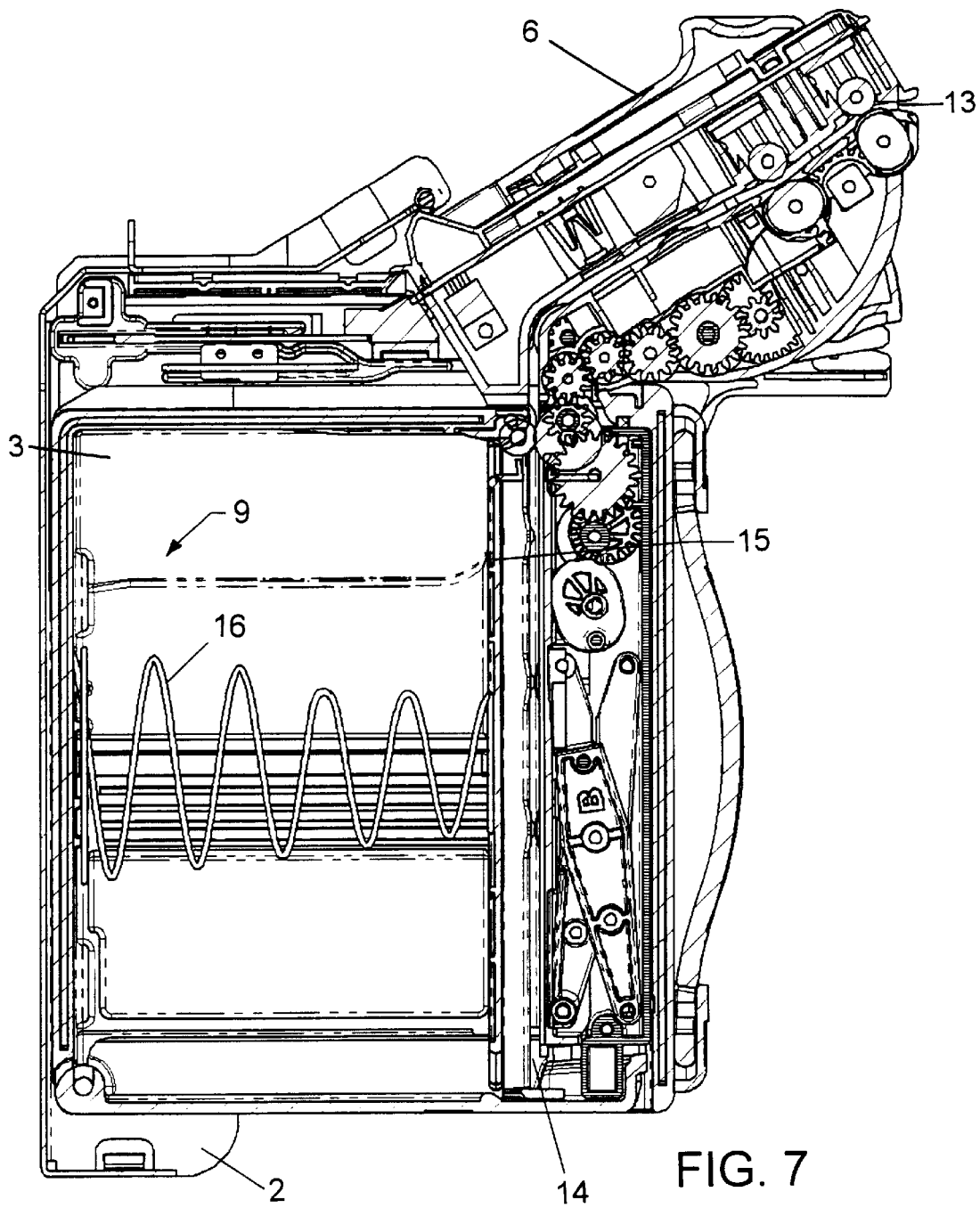
FIG. 7 is a cross-sectional view of the banknote acceptor showing the general arrangement of the bill path.

The simplicity of the compact stacker (29) arrangement (see FIG. 16A) results in a compromise in the mechanical effectiveness of the system. When the mechanism is close to the retracted position as shown in FIGS. 16A and 16B, a very large force must be applied to the central link arm (36) to initiate movement. This force is required, as shown in the cross-sectional view of FIG. 13, to exert pressure via the scissor arms (35) on the banknote pusher plate (32) to strip a banknote (46) from the banknote channel (30) and past the aperture plate (31) into the banknote compartment (9) as shown in FIG. 7. Conversely, it may be seen that a much more advantageous force ratio exists when the stacking mechanism (29) is close to the fully extended position shown in FIGS. 18A and 18B.

If a prime mover is specified of sufficient torque to be adequate at the beginning of the stroke, excessively large forces may be generated at the fully extended position, especially when the removable secure banknote cassette (3) is filled with currency. In order to improve this situation the final gear pair (shown in detail H of FIG. 18) is made from custom parts and includes non-circular drive gear (33) and non-circular driven gear (34). These gears have a profile such that the operating radius varies with angle as the gears rotate. The gears are designed as a complementary pair so the combined operating radii add up to a constant value for any given input angle. The gear profiles are chosen so that the maximum reduction ratio is achieved at the point of highest torque demand. Correspondingly, the maximum increase of ratio occurs close to the fully extended position as shown in FIGS. 18A and 18B where excessive thrust could be a problem. In this instance the profiles are chosen so the gears are capable of continuous rotation. Other gear profiles may be employed if the input drive to the mechanism is reversed as part of the complete cycle.

Current banknote acceptors use belts to transport the banknotes within a stacking mechanism. An alternative arrangement uses a system of drive wheels that may be conveniently connected by simple spur gears.

Figure 19:
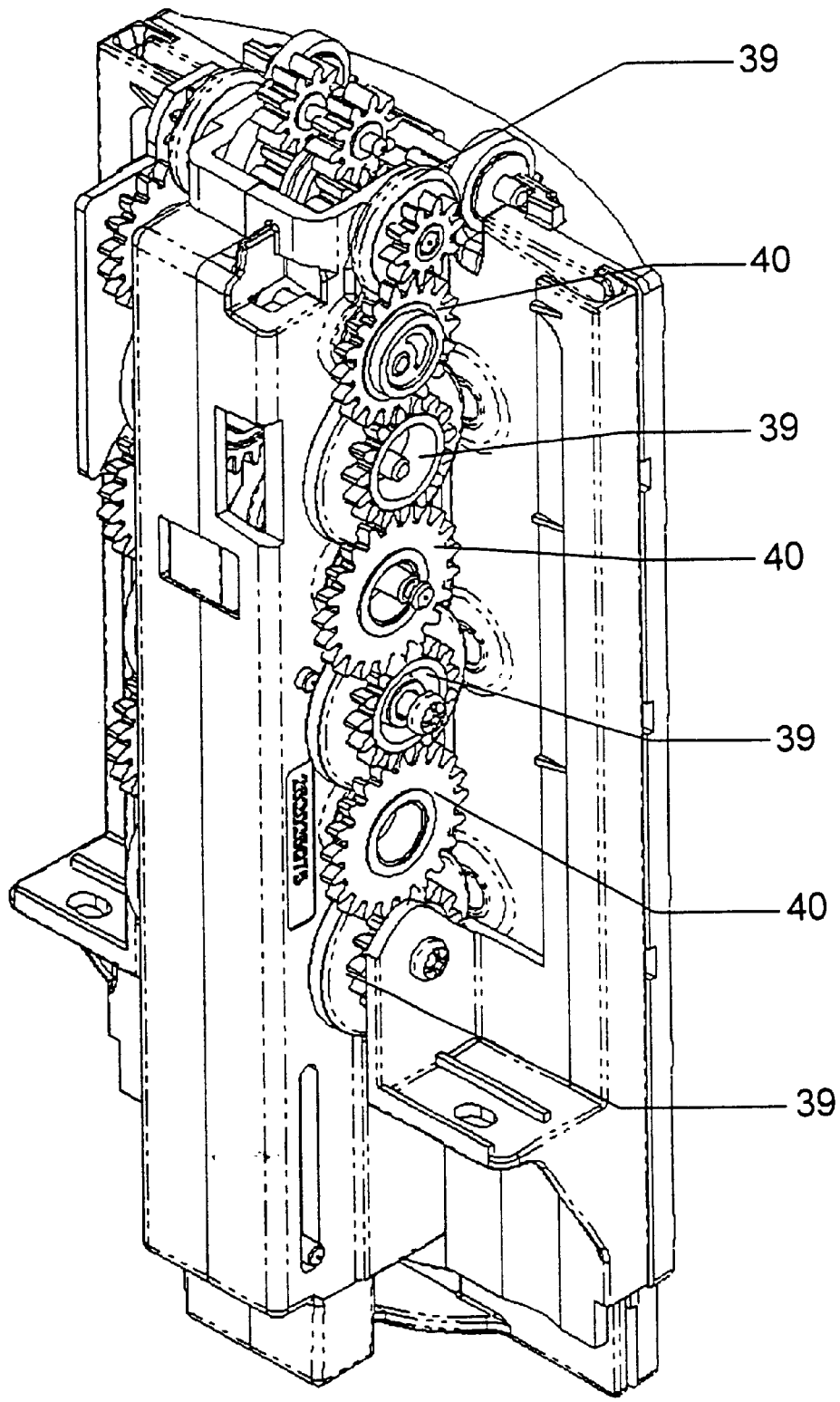
FIG. 19 is a partial cross section of the stacking unit in isometric view. wherein transport rollers and associated drive gears are visible.

FIG. 19 illustrates a partial section of a stacker mechanism. Drive wheel assemblies (39) alternate with intermediate drive gears (40) to form a beltless drive system. Referring to FIGS. 7 and 19, banknotes are transported from the banknote validator (6) in a generally downwards direction to the stacker (29) wherein the banknote is gripped by the drive wheel assemblies (39). Because less material deflection is required in this beltless drive system compared with a belt transport, the mechanical efficiency and durability are also improved. The problem of belt tracking where small shaft miss-alignments cause a belt to wander off its guide pulleys is eliminated as well.

Figure 20:
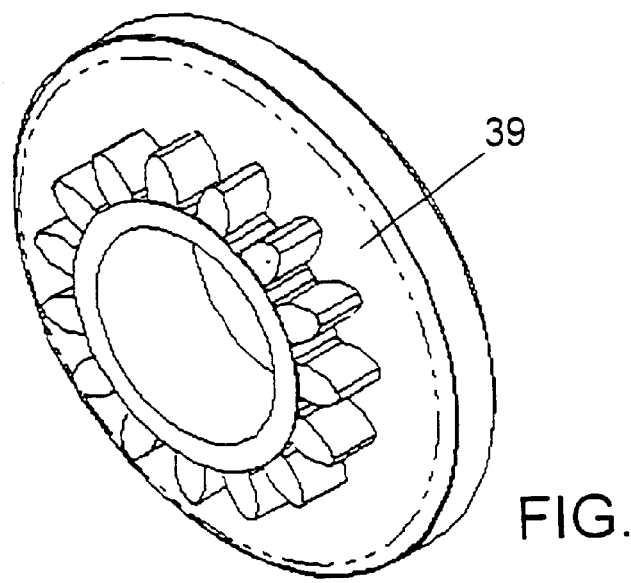
FIG. 20 is a form of a drive wheel that combines gear teeth with an integral molded tire.
Figure 21:
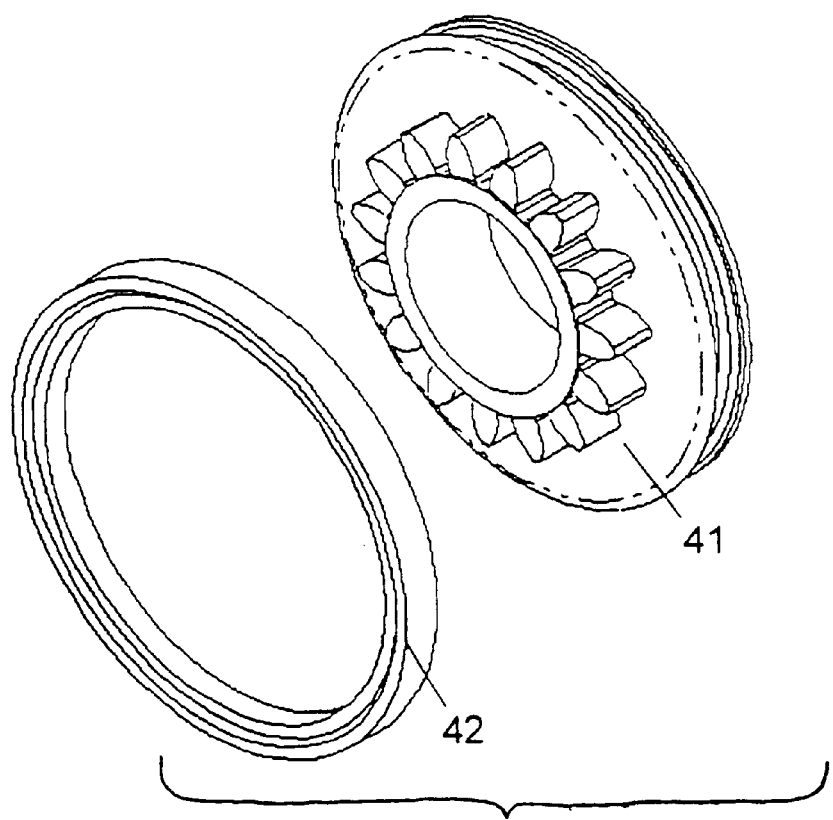
FIG. 21 illustrates the form of the constituent components of the drive wheel assembly of FIG. 20, wherein the tire is formed over the gear hub and is not assembled to it.

FIGS. 20 and 21 illustrate a gear and tire assembly and an exploded view of the gear and tire assembly, respectively. In order to minimize manufacturing cost, the flexible tire material is molded around the gear and hub which is in turn an injection molding using a relatively rigid plastic resin such as Acetal or Nylon. The advantages of this arrangement are that the assembly of the tire to the wheel is eliminated and the geometry of the components may easily include features to prevent slipping or detachment of the tire.

FIG. 19 is a partial section of the stacker and is a cut-away view showing how a spur gear train links a series of drive rollers. FIG. 20 shows the finished form of the driving wheels. FIG. 21 shows the form of the base injection molded gear and hub and the shape of the 'second shot' tire component formed around it. The transport tire and gear are therefore combined in a "two-shot" molding process. The "two-shot" molding process is known, and is described, for example, in Volume 63, Number 10A of "Modern Plastics Encyclopedia", pages 252–265 and 340–346 (October 1986).

The currency access door (7) shown in FIG. 3 is assembled to the cassette by aligning it with the welded assembly and inserting a press fit hinge pin (not shown). A level of security is provided by ensuring that the press fit hinge pin is pressed into a closed ended pocket and the outer surface is sub-flush making covert tampering difficult.

Figure 22:
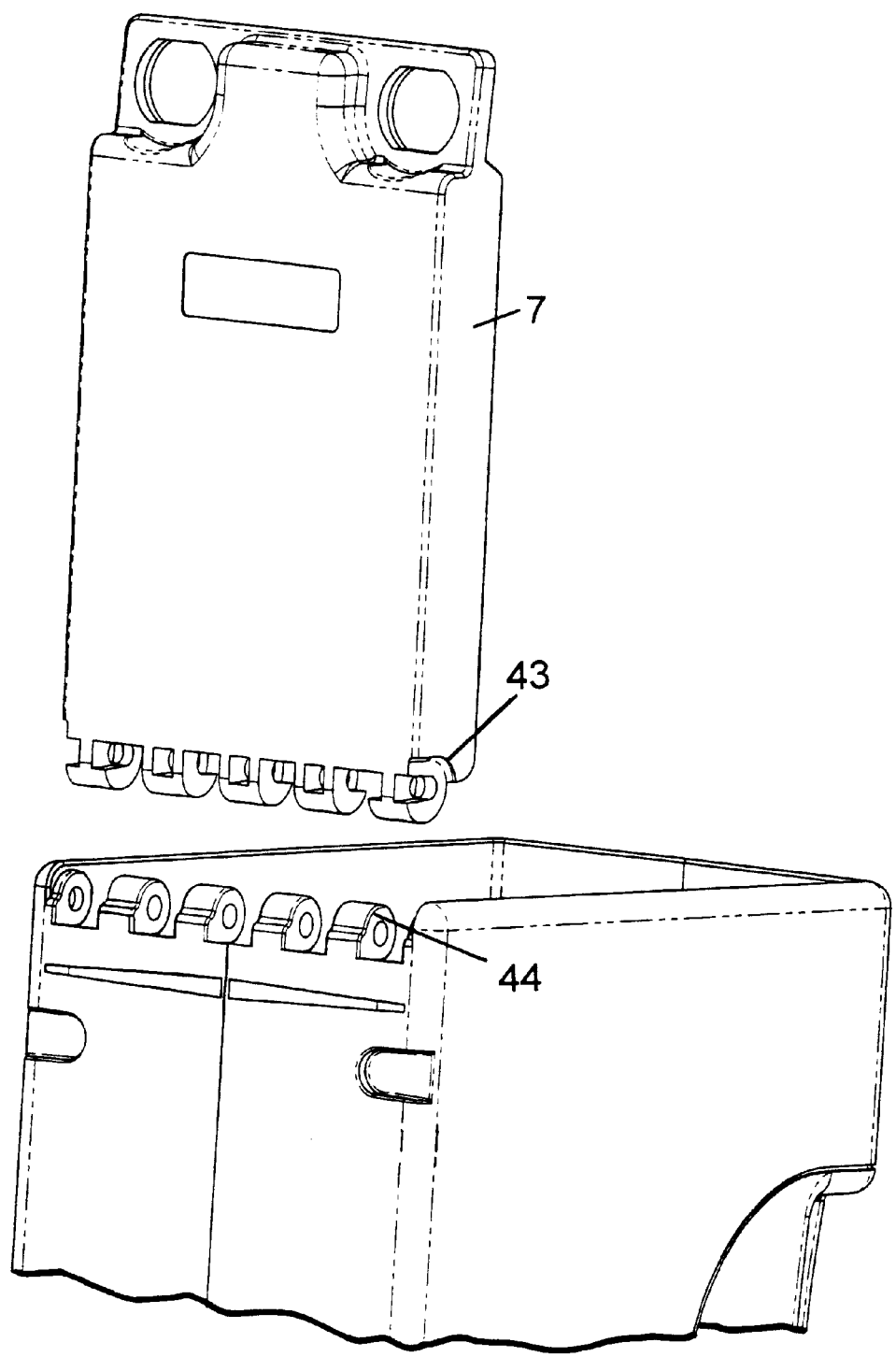
FIG. 22 is a detail view of a hinge design for the cassette.
Figure 23A:
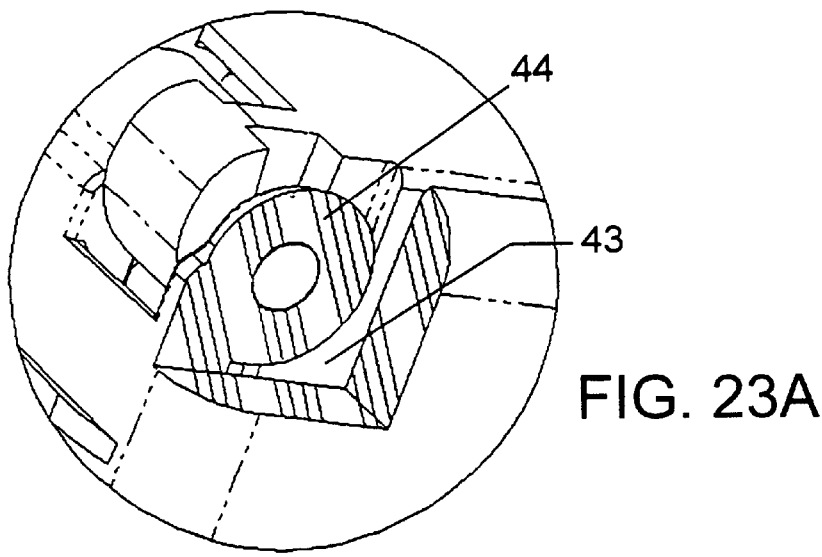
FIG. 23A is a detail view of part of FIG. 23.
Figure 23:
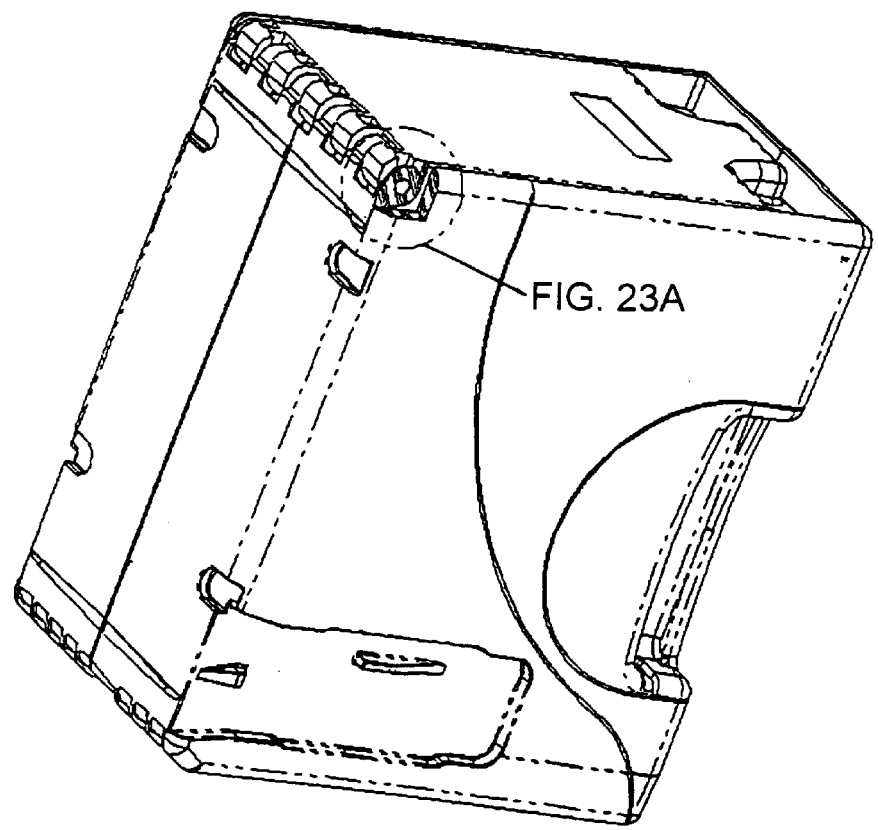
FIG. 23 shows a cut-away section of the cassette hinge illustrating how the door interlocks with the cassette shell.

Referring to FIG. 22, the design of the currency access door (7) also incorporates a novel feature that prevents opening of the door even when the hinge pin is completely removed. It can be seen in FIG. 22 that the form of the door contains a locking rib (43). This feature is duplicated on the opposite (hidden in FIG. 22) side of the door as well. The shape of this locking rib (43) engages with a hinge boss (44) in such a manner that the door cannot be removed from the body of the cassette unless it is first rotated through approximately 90 degrees. FIG. 23 is a cut-away section showing how items (43) and (44) interlock. In normal operation of the cassette the access locks (8) shown in FIG. 2 prevent door rotation when they are in the locked position.

Figure 24A:
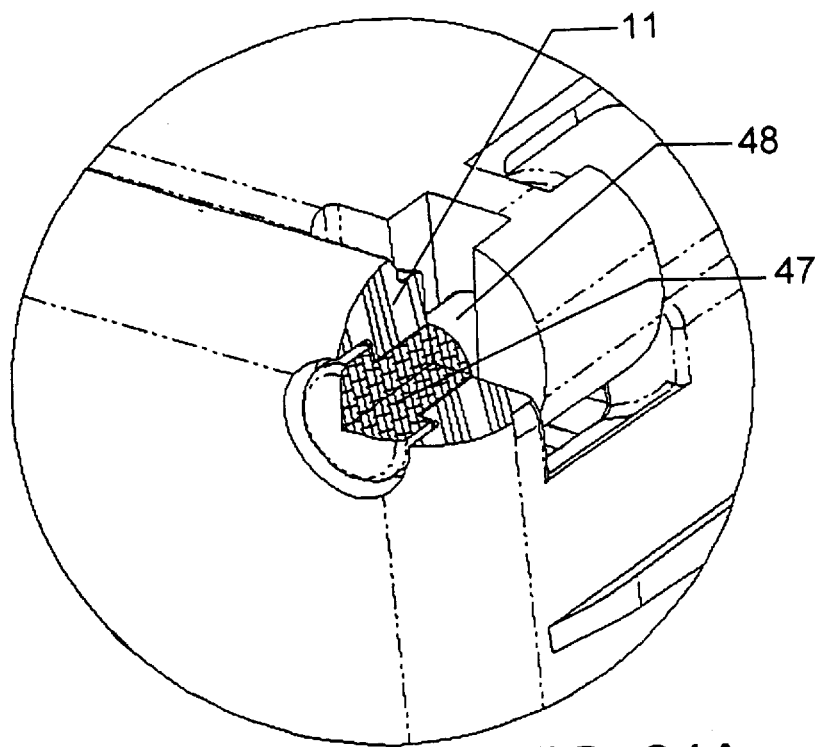
FIG. 24A is a detail view of part of FIG. 24.
Figure 24:
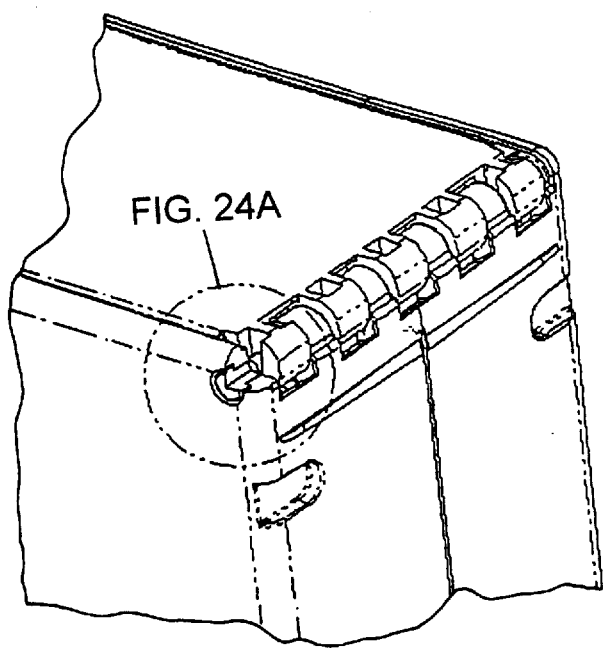
FIG. 24 illustrates an alternative method of securing the hinge using orbital riveting.

In an alternative embodiment a pair of hinge pins are used. One pin is inserted from each side of the cassette. In another alternative implementation shown in FIG. 24, the hinge pin may have one or both ends formed by orbital riveting. For example, a pin (48) with one end preformed is inserted into the hinge assembly and then a head is formed by permanent deformation of the material by, for example, orbital riveting. The result in each case is that the door remains secure even when the hinge pin(s) is (are) removed.

Figure 25:
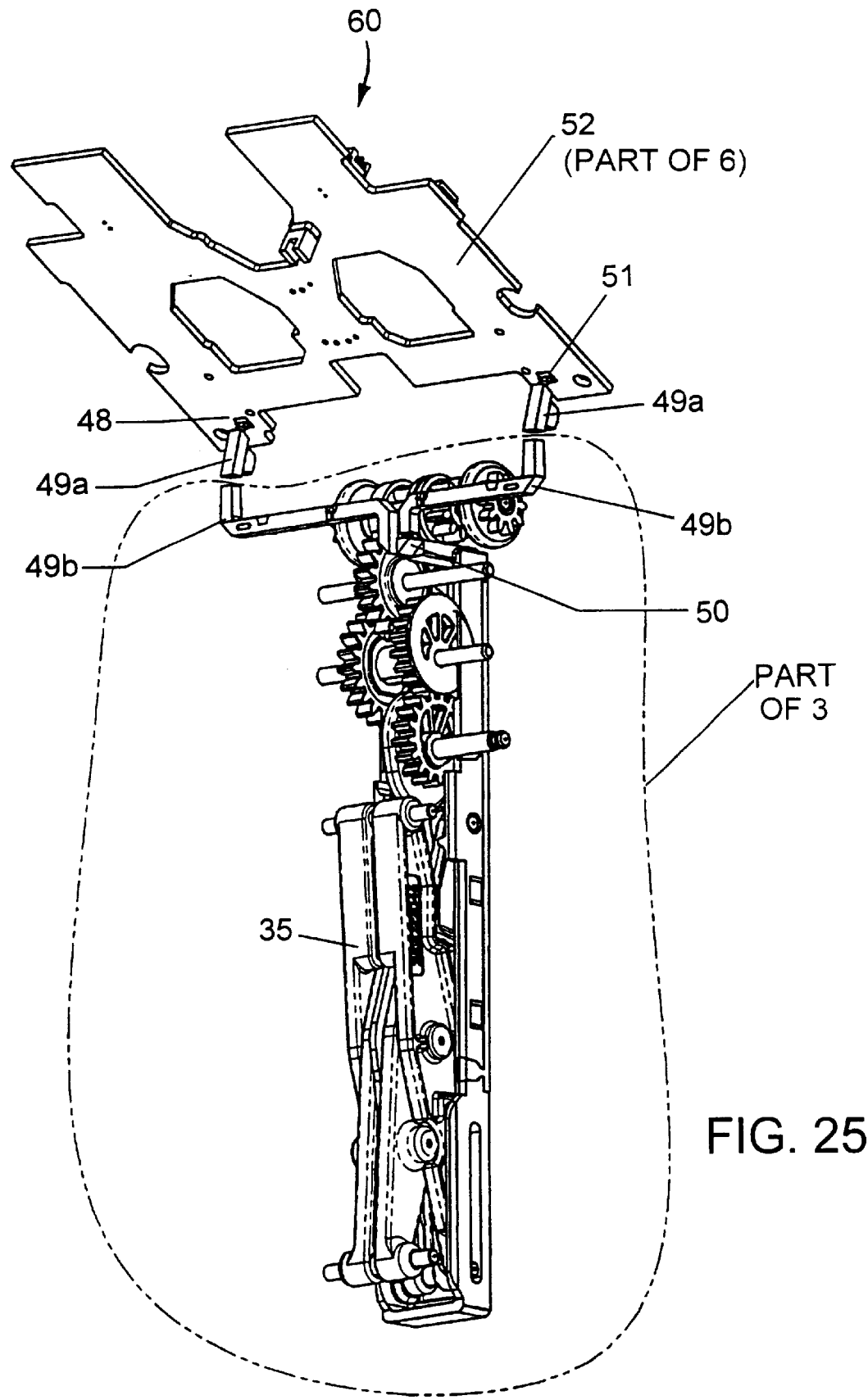
FIG. 25 illustrates an implementation of a combined cassette and stacker home sensor configuration.

FIG. 25 illustrates an implementation of a combined cassette and stacker home sensor configuration (60). This implementation combines the functions of a stacker home sensor and a cassette present sensor in one system, and such a configuration saves costs. An optical sensing arrangement is shown which improves reliability by eliminating electrical connections.

Referring to FIG. 25, a light source (48) is mounted on a printed circuit board (PCB) (52) which is part of a removable banknote validator (6) (see FIG. 7). The light beam is directed along a series of light pipe moldings (49a and 49b). The upper pair (49a) of these moldings are mounted in the removable banknote validator (6). The lower pair (49b) are mounted in the removable secure banknote cassette (3) (see FIG. 7). The light path from light source (48) to light receiver (51) is completed by a prism (50) which may be mounted on the movable banknote pusher plate (32). In such a configuration, the light receiver (51) only receives a signal when the removable secure banknote cassette (3) is present and the banknote pusher plate (32) is at the rest or "home" position which is shown in FIG. 25 and in FIGS. 16a and 16b.

During normal operation a control system sends a signal to drive the stacking mechanism as discussed above with regard to FIGS. 16, 17 and 18. As the scissor arms (35) of the stacking mechanism extend from the home position, the signal output from the light receiver (51) rapidly falls to zero. When the stacker mechanism has completed one full cycle the movable banknote pusher plate (32) returns to its original or home position (shown in FIGS. 16a and 16b) and a positive signal is again seen at the light receiver (51). Upon sensing this signal the control system stops the stacker motor and the unit awaits the next document. Should the light receiver (51) not see a signal within a specified time window after starting the stacking operation, the control system will stop the stacker motor and send a "Cassette Full" message to the host machine.

If the signal level from light receiver (51) falls to a low level without a command to drive the stacking mechanism the control system will assume that the removable secure banknote cassette (3) has been removed and a message to this effect is sent to the host machine. When the same (or another) removable secure banknote cassette (3) is re-installed in the chassis (2) the signal is restored to the light receiver (51) and the banknote processor (1) returns to normal service.

The control system may perform an additional check to verify that a legitimate removable secure banknote cassette (3) has been installed by performing a test run of the stacker mechanism. If the signal from the light receiver (51) shows the characteristic sequential signal transitions representative of a full stacking sequence or cycle, then a genuine removable secure banknote cassette (3) is deemed to be present.

A number of embodiments of the present invention have been described. Nevertheless, it should be understood that various modifications might be made without departing from the spirit and scope of the invention. Accordingly other embodiments are within the scope of the following claims.

What is claimed is:

1. An apparatus comprising a lockable, removable cassette for a banknote processor, the cassette having a single wall construction comprising a plastic shell, and a currency access door connected to the shell.

2. The apparatus of claim 1 wherein the cassette is at least one of a Nylon material, a PPO material, a Polypropylene material, a Polycarbonate material, an ABS material, and a Polyester material.

3. The apparatus of claim 1 wherein the cassette is made from a Polycarbonate and ABS blended material.

4. The apparatus of claim 1 wherein the walls are formed by at least one of Gas Assist Injection Molding, blow molding, rotational molding, Reaction Injection Molding and co-injection of two polymers.

5. The apparatus of claim 1 wherein at least a portion of the shell is combined with a reinforcing material.

6. The apparatus of claim 5 wherein the reinforcing material is at least one of a rigid material to impart strength and a soft material to improve shock absorption.

7. The apparatus of claim 1 wherein at least a portion of the shell is combined with a resilient material.

8. The apparatus of claim 1 wherein the plastic shell comprises a first cassette portion and a second cassette portion joined together by a welding process.

9. The apparatus of claim 1 further comprising at least one of a flexible handle and an integrated grip.

10. The apparatus of claim 1 wherein transport of documents in the apparatus is achieved primarily by rotating rollers formed by a two-shot injection molding process, wherein the rotating rollers comprise an inner core made from a rigid plastic and an outer tire made from a flexible material.

11. The apparatus of claim 1 comprising a hinge pin to secure the access door to the plastic shell, wherein the currency access door remains secure even if the hinge pin is removed.

12. The apparatus of claim 11 comprising a plurality of hinge pins to secure the access door to the plastic shell, wherein the currency access door remains secure even if the plurality of hinge pins are removed.

13. An apparatus comprising a lockable, removable cassette for a banknote processor, the cassette having a single wall construction and comprising a plastic shell, a currency access door connected to the shell, and at least one of an aperture and a transparent window located to allow visual inspection of a document stored in the cassette.

14. The apparatus of claim 10 further comprising an internal mechanism that is at least partially transparent.

15. The cassette of claim 13 including at least one of an aperture and transparent window located to allow visual inspection of a most recent document stored in the cassette.

16. An apparatus comprising a lockable removable cassette comprising:
    a guide means to guide the cassette during installation; and
    a latch means for engagement during installation;
    wherein if the cassette is not securely latched during installation, then a biasing means moves the cassette.

17. The apparatus of claim 16 further comprising at least one of a flexible handle and an integrated grip.

18. The apparatus of claim 16 wherein an unsecured cassette interferes with an access door of a host machine.

19. The apparatus of claim 16 further comprising at least one of an aperture and a transparent window located to allow visual inspection of a document stored in the cassette.

20. The apparatus of claim 16 further comprising a stacker mechanism.

21. The apparatus of claim 20 wherein the stacker mechanism comprises:
    a stacker plate; and
    a drive means coupled to the stacker plate, wherein the drive means includes non-circular drive gears.

22. The apparatus of claim 16 wherein if the cassette is not securely latched during installation, then a biasing means moves the cassette in a direction away from an installation direction.

23. A lockable removable cassette comprising:
    at least one guide;
    at least one lug; and
    at least one ramp;
    wherein when the cassette is loaded into a chassis the guide mates with a chassis guide, the lug mates with a bias means and the ramp mates with a latch means such that if the cassette is improperly loaded then the bias means moves the cassette away from the chassis.

24. The apparatus of claim 23 further comprising at least one of a flexible handle and an integrated grip.

25. The apparatus of claim 23 wherein a failure to securely latch the cassette to the chassis generates a mechanical interference with a door of a host machine.

26. The apparatus of claim 23 further comprising at least one of an aperture and a transparent window located to allow visual inspection of a document stored in the cassette.

27. The apparatus of claim 23 further comprising a stacker mechanism.

28. The apparatus of claim 27 wherein the stacker mechanism comprises:

a stacker plate; and a drive means coupled to the stacker plate, wherein the drive means includes non-circular drive gears.

29. A method comprising:

aligning guide means of a lockable removable cassette with a chassis guide means; and pushing the lockable removable cassette with force sufficient to overcome the resistance of a biasing means to secure the cassette.

30. The method wherein of claim 29 wherein if insufficient force is applied then the biasing means moves the lockable removable cassette away from the chassis.

31. The method of claim 30 wherein an unsecured cassette interferes with the closing of an access door of a host machine.

32. The method of claim 29 further comprising observing a document stored in the cassette through at least one of an aperture and a transparent window.

33. The method of claim 29 further comprising removing the lockable removable cassette by exerting a pull force sufficient to overcome a retention force.

34. A document processing system comprising:

a chassis;

a lockable removable cassette;

a latching means to secure the cassette; and a biasing means;

wherein if the cassette is not securely latched to the chassis then the biasing means moves the cassette.

35. The system of claim 34 further comprising a banknote validator.

36. The system of claim 34 further comprising a stacker mechanism.

37. The system of claim 36 wherein the stacker mechanism comprises:

a stacker plate; and a drive means coupled to the stacker plate, wherein the drive means includes non-circular drive gears.

38. The system of claim 36 further comprising a single sensor that detects the installation of the lockable removable cassette and at least a home position of the stacker mechanism.

39. The system of claim 38 wherein the sensor includes a light source, a light path means and a receiver.

40. The system of claim 39 wherein the light path means comprises a light pipe having at least an input port, an interrupt portion and an output port.

41. The system of claim 40 wherein at least one interrupt portion is connected to a pusher plate of the stacker.

42. The system of claim 40 further comprising a prism.

43. An apparatus for processing documents comprising a front-removable storage cassette wherein the documents are stacked in the cassette from front to rear, with a most recent document stored at the front of the stack.

44. The apparatus of claim 43 comprising a stacker located at a front end of the cassette.

45. The apparatus of claim 44 comprising at least one of an aperture and transparent window located to allow visual inspection of a most recent document stored in the cassette.

* * * * *

UNITED STATES PATENT AND TRADEMARK OFFICE
CERTIFICATE OF CORRECTION

PATENT NO.   : 6,712,352 B2
DATED        : March 30, 2004
INVENTOR(S)  : Alfred F. Bergeron et al.

It is certified that error appears in the above-identified patent and that said Letters Patent is hereby corrected as shown below:

<u>Column 8,</u>
Line 28, replace "claim 10" with -- claim 13 --;

<u>Column 9,</u>
Line 23, after "method" delete "wherein".

Signed and Sealed this

Seventh Day of September, 2004

JON W. DUDAS
*Director of the United States Patent and Trademark Office*

(12) INTER PARTES REEXAMINATION CERTIFICATE (0406th)
United States Patent
Bergeron et al.

(10) Number: US 6,712,352 C1
(45) Certificate Issued: Jul. 10, 2012

(54) LOCKABLE REMOVABLE CASSETTE

(75) Inventors: Alfred F. Bergeron, Chester Springs, PA (US); Robert Clauser, Columbus, NJ (US); Christopher L. Crawford, Pottstown, PA (US); David C. Deaville, West Chester, PA (US); Michael D. Nunn, West Chester, PA (US); Jeffrey T. Thawley, Claymont, DE (US); Kenneth B. Wood, Downingtown, PA (US); Stephen R. Watrous, Moravia, NY (US)

(73) Assignee: Mars Incorporated, McLean, VA (US)

Reexamination Request:
No. 95/000,114, Nov. 4, 2005

Reexamination Certificate for:
Patent No.: 6,712,352
Issued: Mar. 30, 2004
Appl. No.: 09/982,578
Filed: Oct. 16, 2001

Certificate of Correction issued Sep. 7, 2004.

Related U.S. Application Data

(60) Provisional application No. 60/241,197, filed on Oct. 17, 2000.

(51) Int. Cl.
*G07D 11/00* (2006.01)

(52) U.S. Cl. .................. 271/180; 232/15; 271/181
(58) Field of Classification Search .................. None
See application file for complete search history.

(56) References Cited

To view the complete listing of prior art documents cited during the proceeding for Reexamination Control Number 95/000,114, please refer to the USPTO's public Patent Application Information Retrieval (PAIR) system under the Display References tab.

*Primary Examiner*—Peter C. English

(57) ABSTRACT

A lockable, removable cassette is described. In an implementation, the cassette includes a plastic shell and a currency access door. The cassette may also include a flexible handle and/or an integrated grip. In addition, the cassette may include at least one of an aperture and a transparent window positioned to reveal the contents of the cassette. In an implementation, the cassette includes a stacking mechanism which may include a drive means having non-circular drive gears.

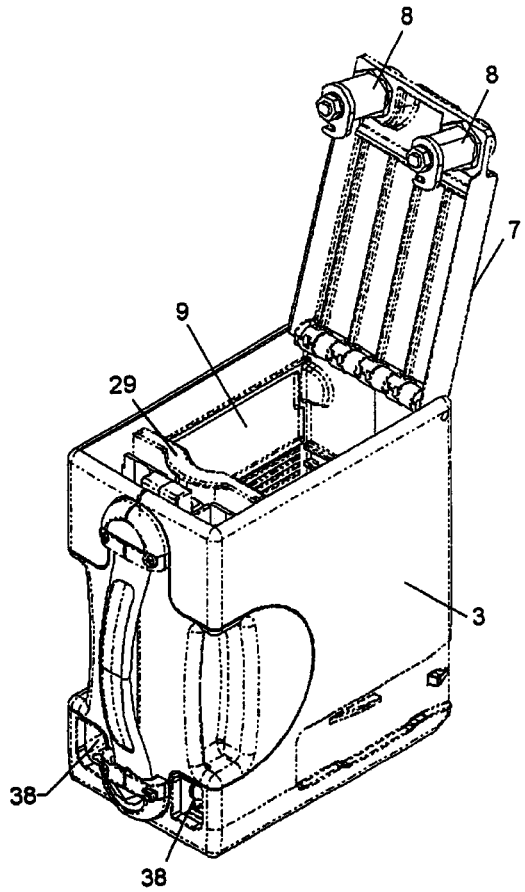

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11, 12, 23-28 and 43-45 is confirmed.

Claims 1-9, 13, 15 and 38 are cancelled.

Claims 10, 14, 16, 21, 29, 34, 37 and 39 are determined to be patentable as amended.

Claims 17-20, 22, 30-33, 35, 36 and 40-42, dependent on an amended claim, are determined to be patentable.

New claims 46-50 are added and determined to be patentable.

10. [The apparatus of claim 1] *An apparatus comprising a lockable, removable cassette for a banknote processor, the cassette having a single wall construction comprising a plastic shell, and a currency access door connected to the shell, wherein transport of documents in the apparatus is achieved primarily by rotating rollers formed by a two-shot injection molding process, wherein the rotating rollers comprise an inner core made from a rigid plastic and an outer tire made from a flexible material.*

14. [The apparatus of claim 13 further comprising] *An apparatus comprising a lockable, removable cassette for a banknote processor, the cassette having a single wall construction and comprising a plastic shell, a currency access door connected to the shell, at least one of an aperture and a transparent window located to allow visual inspection of a document stored in the cassette, and* an internal mechanism in the cassette that is at least partially transparent *to allow visual inspection of a document, stored in the cassette, through said at least one of an aperture or transparent window and through the internal mechanism.*

16. An apparatus comprising a lockable removable cassette comprising:
a guide means to guide the cassette during installation *in a chassis*; and
a latch means for engagement during installation *in the chassis*;
wherein the latch means includes a respective protrusion on each of first and second opposite outer surfaces of the cassette, the protrusion on the first outer surface protruding outwardly from the cassette in an opposite direction from the protrusion on the second outer surface, and
wherein if the cassette is not securely latched during installation, then a biasing means moves the cassette *in a direction away from the chassis, and*

*wherein the cassette is automatically releasable from being securely latched to the chassis by pulling the cassette in a direction away from the chassis with a force sufficient to overcome a retention force.*

21. [The apparatus of claim 20] *An apparatus comprising a lockable removable cassette comprising:*
*a guide means to guide the cassette during installation; and*
*a latch means for engagement during installation; and*
a stacker mechanism, wherein the stacker mechanism comprises:
a stacker plate; and
a drive means coupled to the stacker plate, wherein the drive means includes non-circular drive gears, *and*
*wherein if the cassette is not securely latched during installation, then a biasing means moves the cassette.*

29. A method comprising:
aligning guide means of a lockable removable cassette with a chassis guide means; [and]
pushing the lockable removable cassette with force sufficient to overcome the resistance of a biasing means to secure the cassette *in the chassis, wherein a respective protrusion on each of first and second opposite outer surfaces of the cassette engages the chassis, the protrusion on the first outer surface protruding outwardly from the cassette in an opposite direction from the protrusion on the second outer surface; and*
*subsequently removing the cassette from the chassis, wherein pulling the cassette out of the chassis with a force sufficient to overcome a retention force automatically releases the cassette from being secured to the chassis.*

34. A document processing system comprising:
a chassis;
a lockable removable cassette;
a latching means to secure the cassette *to the chassis, wherein the latching means includes a respective protrusion on each of first and second opposite outer surfaces of the cassette, and wherein the protrusion on the first surface protrudes outwardly from the cassette in an opposite direction from the protrusion on the second outer surface*; and
a biasing means;
wherein if the cassette is not securely latched to the chassis then the biasing means moves the cassette *in a direction away from the chassis, and*
*wherein the cassette is automatically releasable from being securely latched to the chassis by pulling the cassette in a direction away from the chassis with a force sufficient to overcome a retention force.*

37. [The system of claim 36] *A document processing system comprising:*
*a chassis;*
*a lockable removable cassette;*
[wherein the stacker mechanism comprises] *a stacker mechanism comprising*:
a stacker plate; and
a drive means coupled to the stacker plate, wherein the drive means includes non-circular drive gears*;*
*a latching means to secure the cassette; and*
*a biasing means;*
*wherein if the cassette is not securely latched to the chassis then the biasing means moves the cassette.*

39. [The system of claim 38] *A document processing system comprising:*

*a chassis;*

*a lockable removable cassette;*

*a stacker mechanism;*

*a latching means to secure the cassette;*

*a single sensor that detects the installation of the lockable removable cassette and at least a home position of the stacker mechanism, wherein the sensor includes a light source, a light path means and a receiver; and*

*a biasing means;*

*wherein if the cassette is not securely latched to the chassis then the biasing means moves the cassette.*

46. The apparatus of claim 1 comprising a chassis to receive the cassette, the cassette including a respective protrusion on each of first and second opposite outer surfaces to secure the cassette in the chassis, wherein the protrusion on the first surface protrudes outwardly from the cassette in an opposite direction from the protrusion on the second outer surface, and wherein if the cassette is not secured in the chassis, the cassette moves in a direction away from the chassis, and wherein the cassette is automatically releasable from being securely latched to the chassis by pulling the cassette in a direction away from the chassis with a force sufficient to overcome a retention force.

47. The apparatus of claim 1 including integral grips each of which comprises a depression in the outside of the cassette.

48. The apparatus of claim 47 wherein the grips are located on opposite sides of the cassette from one another.

49. The apparatus of claim 48 further comprising a handle on a side of the cassette, wherein the grips are located on sides of the cassette opposite from one another and are located near the side with the handle.

50. A method comprising:

aligning guide means of a lockable removable cassette with a chassis guide means;

pushing the lockable removable cassette with force sufficient to overcome the resistance of a biasing means to secure the cassette in the chassis, wherein a respective protrusion on each of first and second opposite outer surfaces of the cassette engages the chassis, the protrusion on the first outer surface protruding outwardly from the cassette in an opposite direction from the protrusion on the second outer surface; and subsequently removing the cassette from the chassis, wherein removing the cassette consists essentially of exerting a pull force on the cassette sufficient to overcome a retention force and sliding the cassette out of the chassis.

* * * * *